US009350468B2

(12) United States Patent
Bettecken (10) Patent No.: US 9,350,468 B2
(45) Date of Patent: May 24, 2016

(54) METHOD AND DEVICE FOR MEASURING AN LF FIELD AND METHOD FOR ARRANGING AN ANTENNA

(75) Inventor: Jürgen Bettecken, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 202 days.

(21) Appl. No.: 13/989,853

(22) PCT Filed: Nov. 21, 2011

(86) PCT No.: PCT/EP2011/070570
§ 371 (c)(1),
(2), (4) Date: Aug. 26, 2013

(87) PCT Pub. No.: WO2012/069418
PCT Pub. Date: May 31, 2012

(65) Prior Publication Data
US 2014/0073260 A1 Mar. 13, 2014

(30) Foreign Application Priority Data
Nov. 26, 2010 (DE) .......................... 10 2010 062 058

(51) Int. Cl.
*B60C 23/00* (2006.01)
*H04B 17/00* (2015.01)
(Continued)

(52) U.S. Cl.
CPC .......... *H04B 17/0037* (2013.01); *B60C 23/007* (2013.01); *B60C 23/044* (2013.01); *B60C 23/0416* (2013.01); *B60C 23/0437* (2013.01); *B60C 23/0461* (2013.01); *B60C 23/0471* (2013.01); *H04B 17/104* (2015.01)

(58) Field of Classification Search
CPC .... B60C 1/00; B60C 23/044; B60C 23/0444; B60C 23/007; B60C 23/0433; B60C 23/008; B60C 23/0462; B60C 23/0442; B60C 23/0452; B60C 23/0416
USPC .................. 340/447, 442; 73/146.5; 455/41.1
See application file for complete search history.

(56) References Cited

U.S. PATENT DOCUMENTS 7,336,163 B2    2/2008  Fujii
7,454,966 B2 *  11/2008 Fujioka et al. ............... 73/146.5
(Continued)

FOREIGN PATENT DOCUMENTS

DE        102006012534 A1   10/2006
DE      60 2004 006 637 T2   1/2008
(Continued)

*Primary Examiner* — Sonny Trinh
*Assistant Examiner* — Angelica M Perez
(74) *Attorney, Agent, or Firm* — Laurence A. Greenberg; Werner H. Stemer; Ralph E. Locher (57) ABSTRACT

A method and a device for measuring an LF field of an LF transmitter. An LF signal is transmitted with the LF signal intensity by way of the LF transmitter. The LF signal is received by way of an LF receiver installed in a tire of a vehicle, wherein the LF receiver is located in an LF receiver position. An RF signal is transmitted in response to the reception of the LF signal. The RF signal is received by way of an RF receiver. Data representing the LF signal intensity and the LF receiver position are stored. Furthermore, there is provided a method for arranging an LF transmitter for transmitting an LF signal to an LF receiver installed in a tire of a vehicle and/or for arranging an RF receiver.

16 Claims, 6 Drawing Sheets

(51) Int. Cl.
*B60C 23/04* (2006.01)
*H04B 17/10* (2015.01)

(56) References Cited

U.S. PATENT DOCUMENTS

| | | | |
|---|---|---|---|
| 7,508,302 B2 | 3/2009 | Watabe | |
| 7,872,568 B2 * | 1/2011 | Fink et al. | 340/426.33 |
| 7,924,147 B2 * | 4/2011 | Mathias et al. | 340/442 |
| 8,686,847 B2 * | 4/2014 | Lickfelt et al. | 340/447 |
| 2009/0085734 A1 * | 4/2009 | Gila et al. | 340/447 |
| 2009/0145217 A1 | 6/2009 | Saitou et al. | |
| 2009/0243830 A1 * | 10/2009 | Heise et al. | 340/447 |

FOREIGN PATENT DOCUMENTS

| | | |
|---|---|---|
| DE | 102007046495 A1 | 4/2009 |
| WO | 2005018963 A1 | 3/2005 |

\* cited by examiner

FIG. 1

FIG. 5A
Wrong: antenna 3
WU ID 3
LF antenna 3

FIG. 5B
WU ID 4
LF antenna 3

METHOD AND DEVICE FOR MEASURING AN LF FIELD AND METHOD FOR ARRANGING AN ANTENNA

BACKGROUND OF THE INVENTION

Field of the Invention

The present invention relates to a method and an apparatus for gauging an LF field of an LF transmitter, which method can be used for arranging an LF transmitter for sending a signal to an LF receiver installed in a tire of a vehicle and/or for arranging an RF receiver. The present invention also relates to a method and an apparatus for assessing an LF field for installing a tire pressure monitoring system.

A conventional direct tire pressure monitoring system comprises (TPMS, tire pressure measuring system) wheel or tire units (WUs, wheel units) which are installed inside the tire.

There may be a need for a method and for an apparatus for gauging an LF field of an LF transmitter and a need for a method for arranging an LF transmitter for sending an LF signal to an LF receiver installed in a tire of a vehicle and/or for arranging an RF receiver, wherein the methods or apparatuses decrease or even prevent at least some of the aforementioned problems. In addition, there may be a need for a method and an apparatus for gauging an LF field and a need for a method for arranging an LF transmitter and/or an RF receiver on a vehicle which allow reliable installation of transmitters and receivers for a tire pressure monitoring system. In addition, it is an object to provide such a method and such an apparatus.

BRIEF SUMMARY OF THE INVENTION

This object is achieved by the subjects of the independent patent claims. Advantageous embodiments of the present invention are described in the dependent claims.

The invention is a method for gauging an LF field (that is to say a low frequency electromagnetic field) of an LF transmitter (which is particularly mounted on a vehicle, particularly a vehicle frame), wherein the method comprises repeated performance of a measurement step A) by changing an LF receiver position relative to an LF transmitter. In this case, step A) is performed for an LF receiver position that is fixed during this step A), after which the LF receiver position is changed, with step A) then again being performed for the fixed altered LF receiver position. In this case, measurement step A) comprises repeated performance of steps a) to e), which are specified below, by changing an LF signal intensity. This involves the performance of all of steps a) to e) for an LF signal intensity that is fixed during steps a) to e), after which the LF signal intensity is changed, with steps a) to e) then again being performed for a fixed altered LF signal intensity.

In particular, steps a) to e) are therefore performed within a first loop that changes the LF signal intensity, which first loop is performed again within a second loop that changes the LF receiver position.

In this case, steps a) to e) are specified as follows:
a) sending of an LF signal (of an electromagnetic signal, particularly of an electromagnetic wave in a low frequency range) at the LF signal intensity (which has been set in step A), and can be represented by the power of the LF signal, for example) by means of the LF transmitter (which may be installed particularly on a vehicle having tires or wheels, particularly not in a tire);
b) reception (which may particularly comprise capture, registration, detection, conversion, transformation) of the LF signal by means of an LF receiver that is installed in a tire of a vehicle (particularly of a heavy goods vehicle, of an automobile, of a truck) (and that may be comprised particularly in a tire or wheel unit (WU), which may also comprise measurement sensors, such as a pressure measurement sensor, a temperature measurement sensor and/or an acceleration measurement sensor), wherein the LF receiver is located in the LF receiver position;
c) sending (which may comprise particularly emission, transmission, conveyance, communication and/or dispatch) of an RF signal (particularly of an electromagnetic signal, an electromagnetic wave in the radio frequency range) in response (particularly in reaction to) to the reception of the LF signal (in this case, the sending can be effected by means of a transmitter installed in the wheel unit);
d) reception (which may comprise registration, detection, transformation, determination, derivation and/or obtainment) of the RF signal by means of an RF receiver (which may particularly be installed on the vehicle and can particularly communicate with a control unit, this control unit particularly also being able to communicate with the LF transmitter);
e) storage of data that represent the LF signal intensity and the LF receiver position.

In particular, an LF transmitter (in this case an LF antenna can refer to an LF transmitter or an LF receiver) that is installed on a vehicle, for example, thus emits an LF signal that is received by the LF receiver installed in the tire of the vehicle on the basis of the LF receiver position, this also being effected on the basis of the LF signal intensity, since the LF signal intensity can determine a range for the LF signal. Typically, the LF receiver is installed at a position inside the tire, such as close to a valve, of the vehicle, with the LF receiver position being able to change relative to the LF transmitter when the tire rotates further through a section or through an angle. If, after the wheel or the tire has rotated further, the LF receiver is located in an LF receiver position that is outside the range of the LF signal, the LF receiver will no longer receive the LF signal and no further data that represent the LF signal intensity and the altered LF receiver position may be stored. In this way, it is possible to gauge the range of the LF signal and hence the LF field.

The measurement method for gauging the LF field may be used to determine exact positioning for the LF transmitter such that this transmitter can be explicitly allocated a wheel unit, or two wheel units installed on tires that are fitted in mirror-image fashion and that can be distinguished by different directions of rotation.

According to one embodiment, the changing of the LF signal intensity in step A) specified above comprises decreasing the LF signal intensity in steps. In particular, during the performance of steps a), b), c), d) and e), the LF signal intensity needs to be kept constant. After steps a) to e) are performed for the first time, the LF signal intensity can be decreased in order to be kept constant again when steps a) to e) are performed anew. In particular, a range for the LF signal may be greater at relatively high LF signal intensity than at relatively low LF signal intensity.

In particular, the LF transmitter may be controlled by the tire pressure monitoring system controller (TPMS controller) in order to send a low frequency signal (LF signal) to a limited number of wheel units, one of which contains the LF receiver. Each wheel unit (WU) may be equipped with an LF receiver, but without itself being able to emit an LF signal. However, any wheel unit may be equipped with an RF transmitter in order to send the RF signal in response to the reception of the LF signal. Sending of the RF signal from a particular wheel unit therefore indicates that this particular wheel unit has received the LF signal which was emitted by the LF transmitter. When this detected RF signal has been received by the controller of the tire pressure monitoring system by means of the RF receiver, the controller is capable of associating the wheel unit with the LF transmitter (i.e. the LF antenna). If a plurality of LF receivers installed in different tires of the vehicle receive the LF signal, explicit association of an LF receiver (i.e. particularly a wheel unit) with the LF transmitter might no longer be possible. Therefore, it would be necessary to change the positioning of the LF receiver, i.e. to change the LF receiver position, for example.

According to one embodiment, the decreasing of the LF signal intensity is continued for as long as the LF receiver installed in the tire of the vehicle receives the LF signal. The decreasing of the LF signal intensity can then be terminated in order to leave this loop. On the basis of a reduction in the range of the LF signal upon a further decrease in the LF signal intensity, the RF receiver would no longer receive the LF signal in the event of a further decrease in the LF signal intensity. Hence, it is possible to decrease a measurement time.

According to one embodiment, initially the LF signal intensity is set to an LF signal intensity that can be produced as a maximum by the LF transmitter. The maximum LF signal intensity may result in a maximum range for the LF signal. Hence, the maximum number of LF receivers that are installed in different tires of the vehicle can be reached or spanned. In particular, the optimum LF signal intensity can be determined by changing the LF signal intensity in order to allow explicit association of the LF transmitter with the LF receiver.

According to one embodiment, the changing of the LF receiver position comprises rotation of the tire in steps through an angle (or through an angular interval) about an axis of rotation of the tire. In particular, it is possible for the tire to be rotated (particularly by moving the vehicle) through a predetermined angle in order to change the position of the LF receiver position. In particular, the angle or the angular interval may be 5°, 10°, 15°, 20°, 30°, 60° or may have a different value.

According to one embodiment, the tire is rotated in steps about the axis of rotation of the tire such that the LF receiver position is altered over a range of at least 320°. In particular, the LF receiver position can change along a circular path when the tire is rotated in steps about the axis of rotation of the tire. In particular, the LF receiver may be installed close to a valve of the tire. Alternatively, the LF receiver may also be installed close to a running surface of the tire. This makes it a simple matter to achieve a change in the LF receiver position.

According to one embodiment, step e) also comprises storage of data representing an intensity of the received RF signal and a position of the RF receiver. In particular, the RF signal can be emitted by the wheel unit that also comprises the LF receiver that has received the LF signal. In particular, an intensity of the received RF signal may be dependent on a distance between the wheel unit (which contains the LF receiver) and an RF antenna that is installed in the vehicle and, in a normal operating state of the vehicle, receives the tire pressure via an RF transmission from the wheel unit. As a result of the storage of the intensity of the received RF signal and the position of the RF receiver, evaluation makes it possible to determine whether the position of the RF receiver is such that a distinction between two groups of wheel units is possible by distinguishing between the signal intensities. In particular, a signal difference in the RF signal of 10 decibels may be necessary in order to distinguish a wheel unit associated with a first group from a wheel unit associated with a second group.

According to one embodiment, the repeated performance of step A) is performed by changing the LF receiver position relative to the LF transmitter repeatedly, specifically by changing the position of the RF receiver. In particular, this changing of the position of the RF receiver can be undertaken if it turns out that two explicitly determinable groups of RF transmitters (i.e. particularly wheel units) cannot be distinguished. This allows the position of the RF receiver to be optimized.

According to one embodiment, the method is performed for a plurality of LF receivers, wherein each of these LF receivers is installed in an associated tire from a plurality of tires of the vehicle. In particular, an LF receiver of a tire may be comprised in a wheel unit that likewise has a transmitter for sending the RF signal. In particular the LF receiver and the RF transmitter in the wheel unit can communicate with one another, with the result that RF transmitter emits the RF signal only if the LF receiver has received the LF signal. By providing a plurality of LF receivers, it is possible for the LF field to be gauged over a relatively large physical range, particularly when the LF receivers are arranged at different locations, for example on four, on six, on eight or on 10 tires of a vehicle.

According to one embodiment, the method is performed for a plurality of LF transmitters, which may be installed particularly at different locations on the vehicle, with the result that each LF transmitter from the plurality of LF transmitters can be allocated to precisely one tire or no more than two tires (which are fitted in mirror-image fashion, in particular).

According to one embodiment, the LF signal has a frequency between 1 kHz and 200 kHz, particularly a frequency of approximately 125 kHz. This means that a conventionally available LF transmitter can be used as an LF transmitter.

According to one embodiment, the RF signal has a frequency between 300 MHz and 500 MHz, particularly 315 MHz or 434 MHz, or alternatively 868 MHz. This means that a conventional RF transmitter can be used as an RF transmitter and a conventional RF receiver can be used as an RF receiver, the latter already being able to be used in conventional tire pressure monitoring systems.

According to one embodiment, the LF field sent by the LF transmitter has a range between 1 cm and 200 cm. Hence, by way of example, the LF transmitter may be mounted on an area of the vehicle close to a tire of the vehicle in order to emit an LF signal such that it can be received and detected by the RF receiver installed in the tire. In particular, the range of the LF field may be limited by a sharply falling (for example exponentially) intensity of the LF field if said field is measured in a range greater than approximately 100 cm, or 200 cm. This allows an LF transmitter to be exactly associated with an LF receiver that is installed in a tire.

According to one embodiment, the LF transmitter and/or the RF receiver communicate with a tire pressure measurement system (or are controlled or actuated by the latter), wherein said tire pressure measurement system can be controlled or actuated by a computer program, particularly via an interface. In particular, a conventional tire pressure monitoring system can be adapted by control by means of a computer program in order to carry out a method as described above.

According to one embodiment, a method for arranging (particularly positioning, adjusting and/or setting up) an LF transmitter (which may be installed on a vehicle) for sending an LF signal to an LF receiver installed in a tire of a vehicle and/or for arranging an RF receiver is provided. In this context, it is therefore possible for the LF transmitter and/or the RF receiver to be arranged such as to allow association of signals that are emitted by different wheel units. In this case, the method comprises: performance of a method for gauging an LF field of the LF transmitter as described above; determination (which may comprise evaluation, testing, checking, derivation) of whether the data meet a predetermined criterion (for example whether only particular LF receivers have received the LF signal; whether the RF signal sent by different wheel units differs at least by 10 decibels; and/or whether each wheel unit, particularly each LF receiver, has received an LF signal from at least one LF transmitter); and changing of a position of the LF transmitter (which may comprise refitting the LF transmitter at a different location of the vehicle, for example) and/or the RF receiver (which may likewise comprise refitting the RF receiver at a different position on the vehicle) and performance, again, of the method for gauging the LF field as described above if the data do not meet the predetermined criterion. If the data do not meet the predetermined criterion, this may indicate that the positioning of at least one LF transmitter and/or of at least one RF receiver is an obstacle to explicit association of the wheel unit with an LF transmitter. For redundancy reasons, a wheel unit or a plurality of wheel units may not be associated with an LF transmitter in this case. If the data do meet the predetermined criterion, all LF transmitters and all RF receivers are positioned correctly, which means that the tire pressure monitoring system, upon receiving an RF signal that indicates the pressure of a tire, for example, knows or can infer from which tire the signal has been sent.

According to one embodiment, a computer-readable storage medium is provided which stores a program, which program is set up to perform or control the method as claimed in one of the preceding claims.

According to one embodiment, a program element is provided which, when executed by a processor, is set up to perform or control one of the aforementioned methods.

According to one embodiment, an apparatus for gauging an LF field of an LF transmitter is provided, wherein the apparatus has: an LF transmitter for emitting an LF signal of a variable LF signal intensity; an LF receiver installed in a tire of a vehicle for receiving the LF signal, wherein the LF receiver is located in a variable LF receiver position relative to the LF transmitter; an RF transmitter for sending an RF signal in response to the reception of the LF signal; an RF receiver for receiving the RF signal; a memory for storing data representing the LF signal intensity and the LF receiver position; a controller for changing the LF signal intensity and changing the LF receiver position relative to the LF transmitter; an evaluation unit for evaluating the data and determining whether the data satisfy a predetermined criterion.

According to one embodiment, the LF receiver and the RF transmitter are held in a tire measurement unit (WU) that is installed in the tire, this tire measurement unit also having a tire pressure sensor and/or a temperature sensor and/or an acceleration sensor. In addition, the tire measurement unit may have an electronic controller or a semiconductor chip that can communicate with the sensors.

Features (individually or in any combination) that have been disclosed in connection with embodiments of methods can likewise (individually or in any combination) be used for the apparatus.

Embodiments of the present invention will now be explained with reference to the appended drawings.

DESCRIPTION OF THE INVENTION

A direct tire pressure monitoring system according to one embodiment comprises (TPMS, tire pressure measuring system) wheel or tire units (WUs, wheel units) that are installed inside the tires, a number of antennas and receivers, and also a central control unit. Pressure sensors inside the wheel units measure the tire pressure and transmit the data to the central control unit by means of radio frequency transmission (RF transmission). The control unit processes the data and generates warnings to the driver of the vehicle in the event of detected tire pressures that do not correspond to predetermined tire pressures. In particular, the system can report an excessively low air pressure in a specific tire to the driver of the vehicle.

In order to ascertain the position of the tire that is defective in terms of tire pressure for the driver of the vehicle, the tire pressure monitoring system (TPMS) needs to be able to distinguish between different tire units or wheel units from an explicit piece of wheel unit identification information (WU ID) that is respectively transmitted to the central control unit in an RF message (together with the pressure measured values) from the wheel unit. Learning or associating the various wheel units with a particular wheel position can be performed by means of explicit programming (e.g. using a diagnostic tool) or automatically by the system itself. Automatic learning avoids additional work requirements in the workshop or factory. Furthermore, wheel fitters are often not trained to use diagnostic tools.

Localization technologies for localization need to be implemented, particularly for the purpose of automatically localizing wheel units, with the tire pressure monitoring system automatically recognizing new wheels that are fitted on the vehicle. In order to localize the various wheel units, firstly what is known as RF localization is used, which is suitable for distinguishing two or more groups of wheel units from one another. In this case, one group of wheel units may relate to the wheels that are fitted on the front axle, for example, and another group of wheel units may relate to those wheels that are fitted on one or more rear axles of the vehicle, for example.

For side localization (or more generally for further group localization of usually one to no more than two group members, i.e. 1 to 2 WUs; no more than two because, in the case of a twin tire, these can be explicitly assigned by means of the direction-of-rotation recognition in the WU), on the other hand, what is known as the LF localization method is used. In order to implement the RF technology and/or the LF technology for localizing the wheel units, various additional hardware components need to be fitted on the vehicle that also interact or interchange data with one another. In order to be able to use the RF technology and/or the LF technology in a vehicle for localizing the various tire or wheel units, the installation of one or more antennas for emitting and/or receiving electromagnetic waves is necessary. In particular, the installation of at least one RF antenna for receiving a radio frequency signal and the installation of one or more LF antennas for sending an LF signal (low frequency signal) are necessary. In this case, specific localization of the RF antenna used, and/or of the LF antennas, is necessary in order to be able to explicitly associate RF signals received from the wheel units with a particular tire position.

Very complex methods can be performed in order to position the RF antenna and/or the one or more LF antennas on a vehicle such that explicit association of the signals received from the tire or wheel units for a particular tire position is possible. In this case, a distinction can be drawn particularly between two instances of application or business cases. Firstly, in OEM business, it is necessary to determine the antenna positions of all antennas for a new vehicle model, after which the antennas can be installed at the determined positions. In this case, a manufacturer of a tire pressure monitoring system (TPMS) can provide it for one or more given vehicle platforms or vehicle variants. For these different vehicle variants or vehicle platforms, it is necessary to determine the correct positions of the antennas (receivers and/or transmitters) in order to provide a functional tire pressure monitoring system. Another business case is the case of retrofitting a vehicle or upgrading a vehicle with a tire pressure monitoring system. In this case, different people frequently perform the upgrade on the vehicle with the tire pressure monitoring system.

In the OEM business field, every single vehicle platform or vehicle variant is analyzed or gauged by an RF application engineer and an LF application engineer of the manufacturer of the tire pressure monitoring system in order to determine the suitable antenna positions. These LF and RF engineers have the requisite expert knowledge in order to determine the correct antenna positions in two independent steps for the RF antenna and the LF antennas. In this case, the LF engineer fits the LF antennas in positions that, on the basis of experience, allow adequate distinction between the different wheel units. Following this installation or following this fitting of the LF antennas, the LF field is gauged using a special LF measurement probe and using special LF measurement equipment in order to check whether it is possible to distinguish between the different wheel units in the case of the given installation or in the case of the given installation positions of the antennas. In particular a check is performed to determine whether a space that is covered by the one or more LF antennas (in this case LF transmitter) spans only particular wheel units, whereas other wheel units are not spanned. The LF coverage area is the physical area in which the wheel unit is capable of detecting the LF field sent by means of the LF antenna. In addition, it is necessary to ensure that those wheel units that are located close to this coverage area but that are not part of this area are not activated. Therefore, a large number of measurement points need to be evaluated manually for each LF antenna fitted on the vehicle. This requires expert knowledge and a large amount of time and cost.

The RF engineers need to measure the field strength of each fitted wheel unit, which emits RF signals, in particular, which is detected by means of a dedicated RF reception antenna. In addition, the RF engineers need to ensure that the requisite RF field strength difference (for example 10 dB) between the specified areas is observed in order to prevent erroneous localization of wheel units.

Improved methods and apparatuses are described below.

Figure 1:
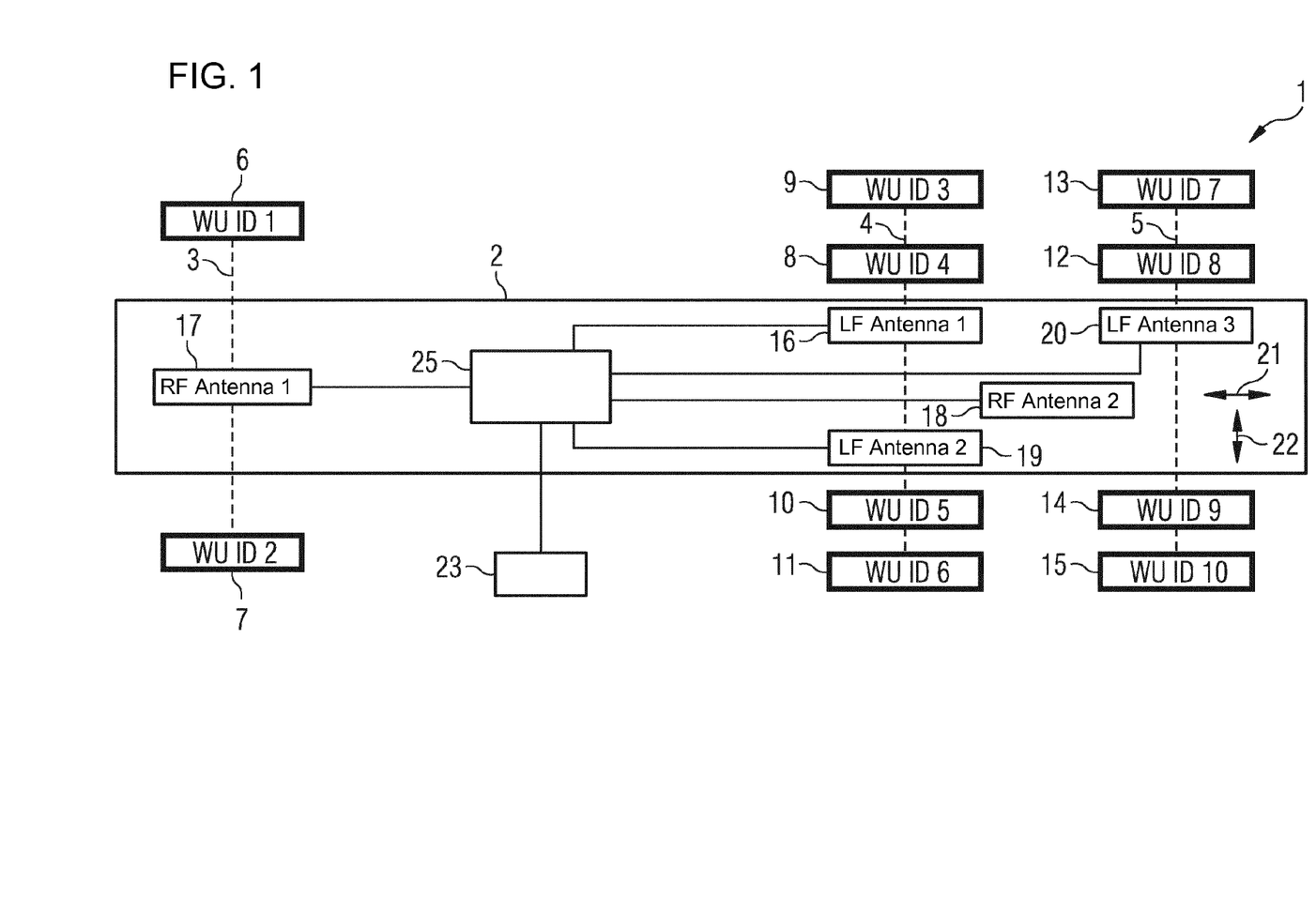
FIG. 1 shows a schematic view of a vehicle with a tire pressure monitoring system that has been installed in line with a method for arranging an LF transmitter and/or for arranging an RF receiver.

FIG. 1 shows a schematic view of a vehicle 1, in this case a heavy goods vehicle having three axles, in which a tire pressure monitoring system has been installed using a method for arranging an LF transmitter and/or for arranging an RF receiver according to one embodiment. A vehicle body 2 contains a front axle 3, a first rear axle 4 and a second rear axle 5 in rotatable fashion. The front axle 3 is fitted with a right tire 6 and a left tire 7, wherein the right tire 6 has a first wheel unit (WU ID 1) installed in it and the left tire 7 has a second wheel unit (WU ID 2) installed in it. The right-hand side of the first rear axle 4 is fitted with a tire 8 having a fourth wheel unit (WU ID 4) and with a tire 9, fitted in mirror-image fashion with respect to the tire 8, having a third wheel unit (WU ID 3). The left-hand side of the first rear axle 4 is fitted with a tire 10 having a fifth wheel unit (WU ID 5) and with a tire 11, fitted in mirror-image fashion with respect to the tire 10, having a sixth wheel unit (WU ID 6). The right-hand side of the second or back rear axle 5 is fitted with a tire 12 having an eighth wheel unit (WU ID 8) and, in mirror-image fashion with respect to the tire 12, with a tire 13 having a seventh wheel unit (WU ID 7). The left-hand side of the second rear axle 5 is fitted with a tire 14 having a ninth wheel unit (WU ID 9) and with a tire 15, fitted in mirror-image fashion with respect to the tire 14 having a tenth wheel unit (WU ID 10). The wheel units of the vehicle 1 each have a pressure sensor, a temperature sensor, an acceleration sensor, an LF receiver, an RF transmitter and an electronic controller with a power supply.

In addition, the vehicle 1 has a first LF antenna (first LF transmitter) 16 that is installed close to the first rear axle 4 adjacent to the tires 8 and 9 on the right-hand side. The LF transmitter 16 is designed to emit an LF signal that has a limited range, with the result that only a limited number of wheel units (or LF receivers integrated therein) are able to register the LF signal. With optimum positioning of the first LF transmitter 16, an LF signal emitted by the LF transmitter 16 should reach only the LF receivers installed in the tires 8 and 9, but not a further LF receiver that is installed in one of the other tires. In addition, the vehicle 1 has a second LF transmitter 19 that is arranged close to the tires 10 and 11 on the left-hand side of the vehicle, which are fitted on the first rear axle 4 of the vehicle.

In order to achieve positioning of the LF transmitter 16 (or of any other LF transmitter 19, 20) such that exclusively the tires 8 and 9 on the right-hand side of the vehicle, which are installed on the first rear axle 4, are within the range of the LF field that is produced by the LF transmitter 16, the field produced by the LF transmitter 16 can be gauged according to one embodiment.

To this end, an LF signal intensity of the LF transmitter 16 is first of all set to a maximum value and an LF signal is emitted with said maximum signal intensity. If one of the wheel units (or the LF receivers that the latter comprise) installed in the tires 8, 9, 10, 11, 12, 13, 14 or 15 receives this signal, the relevant wheel unit (or an RF transmitter that the latter comprises) sends an RF signal in response to the reception of the LF signal that has been emitted by means of the LF transmitter 16.

The RF signal is received either by the first RF antenna 17 or the second RF antenna 18 and is transmitted to a controller 25 that stores (either internally or externally) the relevant LF signal intensity and a position for the LF transmitter 16 in a coordinate system 20. In particular, the controller 25 also controls the LF transmitter 16 in order to emit the LF signal at a particular LF signal intensity. While the LF signal intensity is maintained at a maximum value, the position of the LF receivers installed in the tires of the vehicle 1 is now changed by rotating the tires through 30°, for example. Again, the LF transmitter 16 emits an LF signal of the maximum signal intensity, whereupon those wheel units that receive the LF signal respond thereto by transmitting an RF signal to one of the RF antennas 17 or 18, which in turn forward this signal to the controller 25.

Figure 2A:
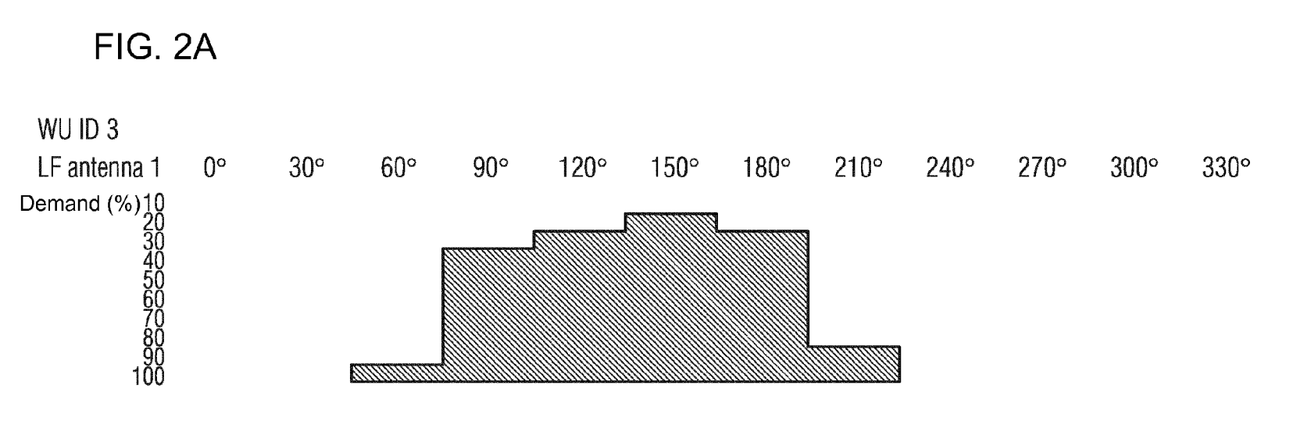
FIGS. 2A and 2B show diagrams for received LF signals according to one embodiment.
Figure 2B:
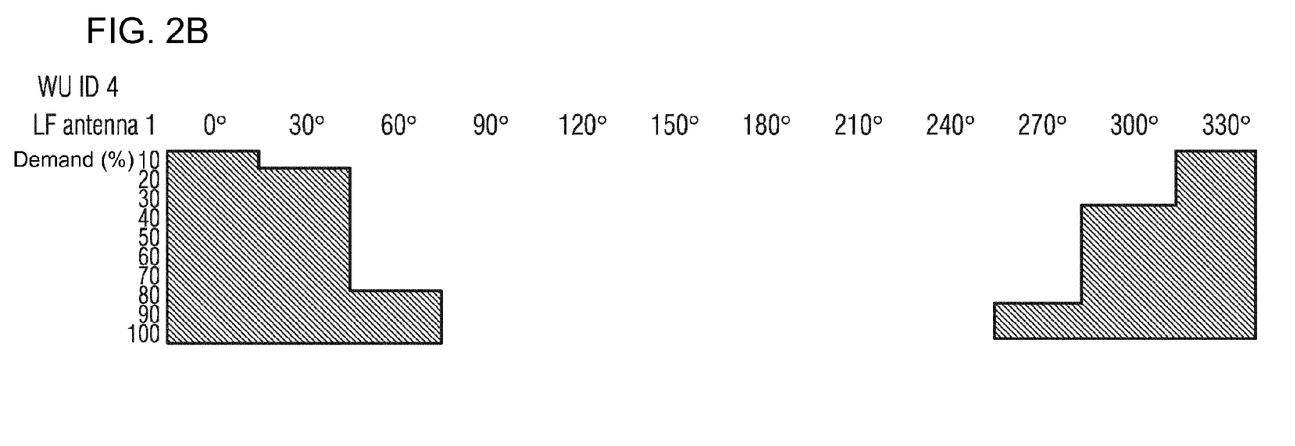

This method is now performed for a declining RF signal intensity of the LF signal emitted by the LF transmitter 16 in order to obtain data about the range of the LF field emitted by the LF transmitter 16, which data are illustrated in FIGS. 2A and 2B. In this case, an abscissa plots a rotary position for the tire in which the respective wheel unit with the LF receiver therein is installed. The ordinate plots the LF signal intensity (as power in percent).

In particular, FIGS. 2A and 2B illustrate reception events for the LF signal and emission events for an RF signal from the third wheel unit (FIG. 2A) and from the fourth wheel unit (FIG. 2B) when just the LF transmitter 16 emits an LF signal. All other wheel units installed in other tires do not register any reception events for the LF signal emitted by the LF transmitter 16 and are therefore not illustrated explicitly. As FIG. 2A shows, the LF receiver installed in the third wheel unit in the tire 9 detects reception of the LF signal at an LF signal intensity of 100% from the LF transmitter 16 over a range from approximately 60° to approximately 220°. When the LF signal intensity decreases, the angle range in which the third wheel unit (or the LF receiver therein) detects the LF signal is reduced.

As can be seen from FIG. 2B, the fourth wheel unit, which is installed in the tire 8, also registers the LF signal emitted by the LF transmitter 16, but in an angle range (from approximately 270° to 60°, which becomes narrower as LF signal intensity declines) that is different than the angle range in which the third wheel unit (which is installed in the tire 9) detects the LF signal.

Hence, only the wheel units that are installed in the tires 8 and 9 are able to receive an LF signal that is sent by the LF transmitter 16, but no further wheel unit in any other tire on the vehicle 1. Hence, the LF transmitter 16 is in correct positioning.

Data which are transmitted to the controller (via the RF antenna 17 or the RF antenna 18) by the third wheel unit or the fourth wheel unit by means of RF technology can be distinguished from the fact that (during travel) the two tires 8 and 9 rotate oppositely (since they are fitted in mirror-image symmetrical fashion with respect to one another).

Figure 3A:
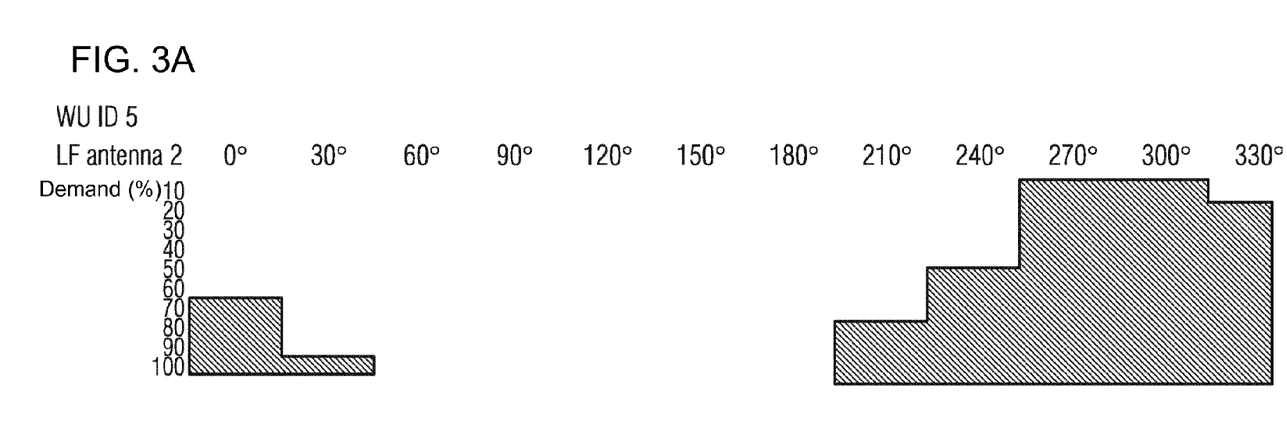
FIGS. 3A and 3B show diagrams for received LF signals according to one embodiment.
Figure 3B:
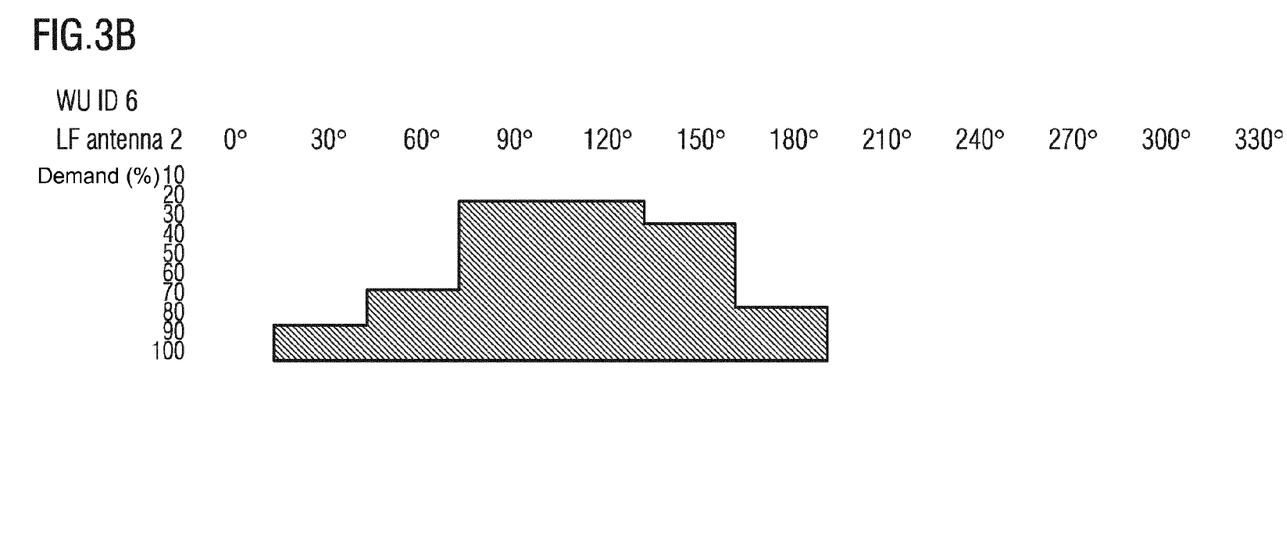

FIGS. 3A and 3B illustrate measurement results for gauging an LF field that is emitted by the LF transmitter 19, which is installed close to the first rear axle 4 on the left-hand side of the vehicle. FIG. 3A illustrates events from reception of the LF signal emitted by the LF transmitter 19 by the fifth wheel unit, which is installed in the tire 10 on the left-hand side on the first rear axle of the vehicle 1. In this case, the fifth wheel unit (or the LF receiver therein) installed in the tire 10 detects the LF signal in an angle range of approximately 210°-30°. As is also illustrated in FIG. 3B, the sixth wheel unit illustrated in the tire 11 also receives the LF signal that is emitted by the LF transmitter 19, but in this case in a range of approximately 30°-180°, which becomes narrower as LF signal intensity declines. Wheel units other than the fifth wheel unit and the sixth wheel unit (i.e. further LF receivers installed in other tires) do not register the LF signal emitted by the LF transmitter 19. Hence, the LF transmitter 19 is also positioned correctly.

Figure 4A:
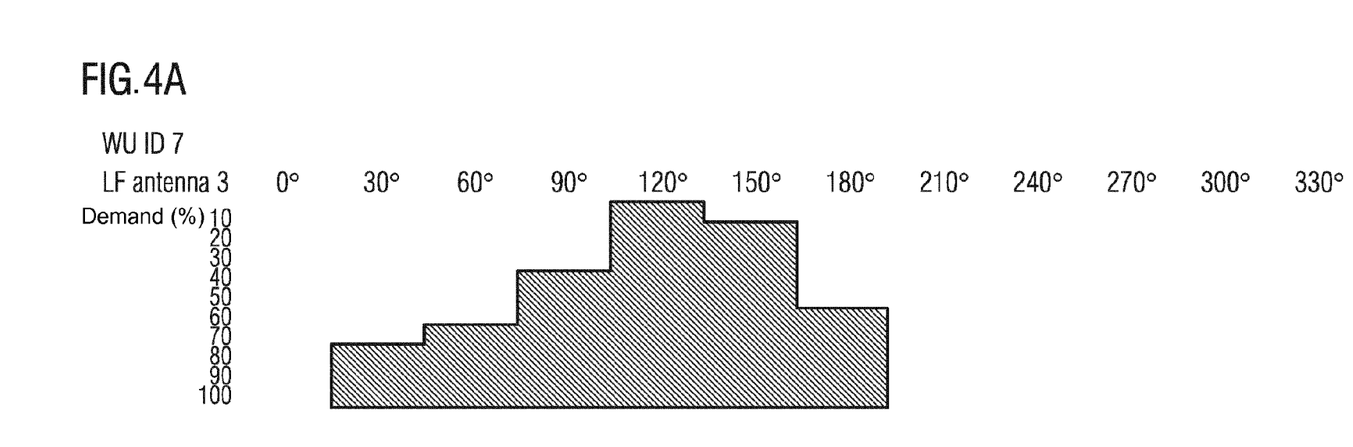
FIGS. 4A and 4B show diagrams for received LF signals according to one embodiment.
Figure 4B:
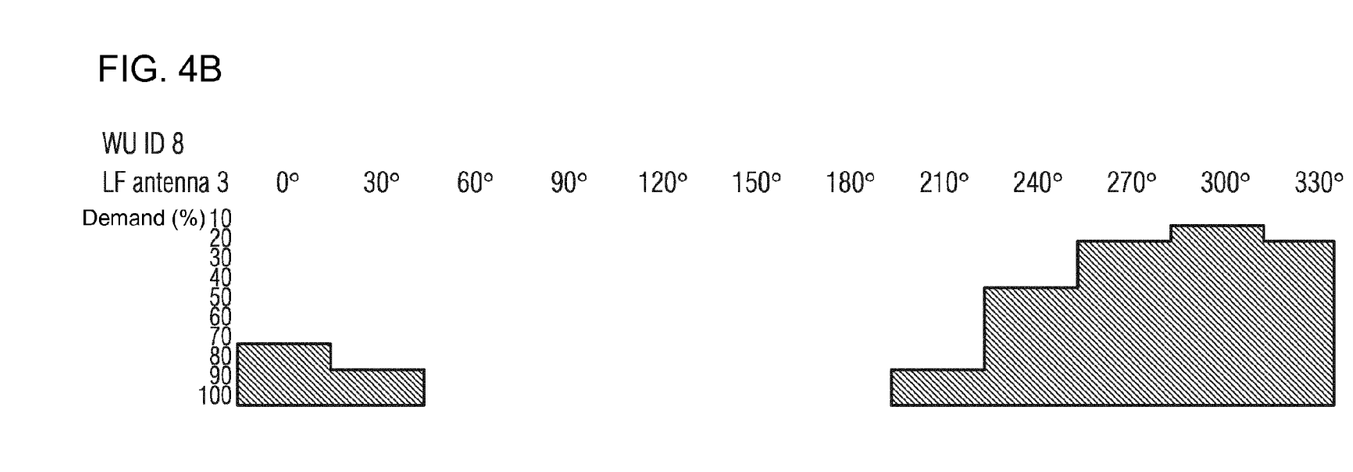
Figure 5A:
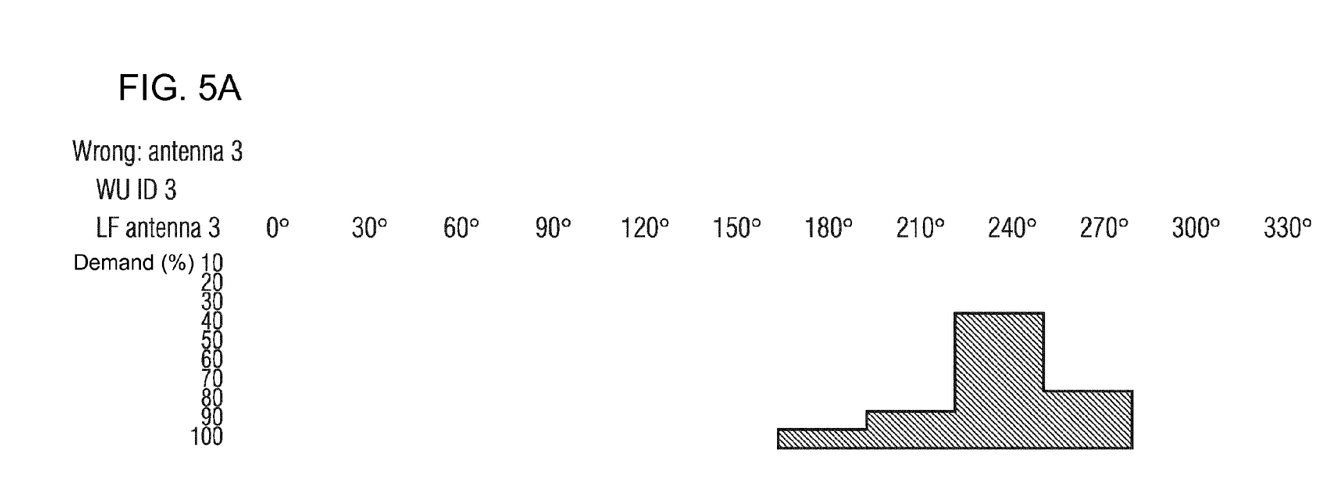
FIGS. 5A, 5B, 5C and 5D show diagrams for received LF signals according to one embodiment.
Figure 5B:
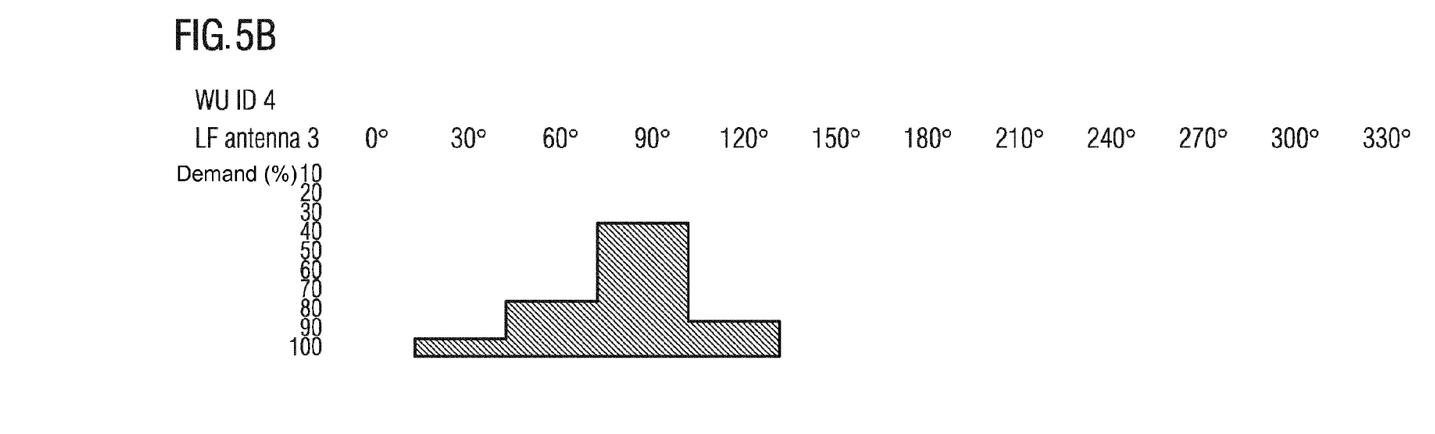
Figures 5C, 5D:
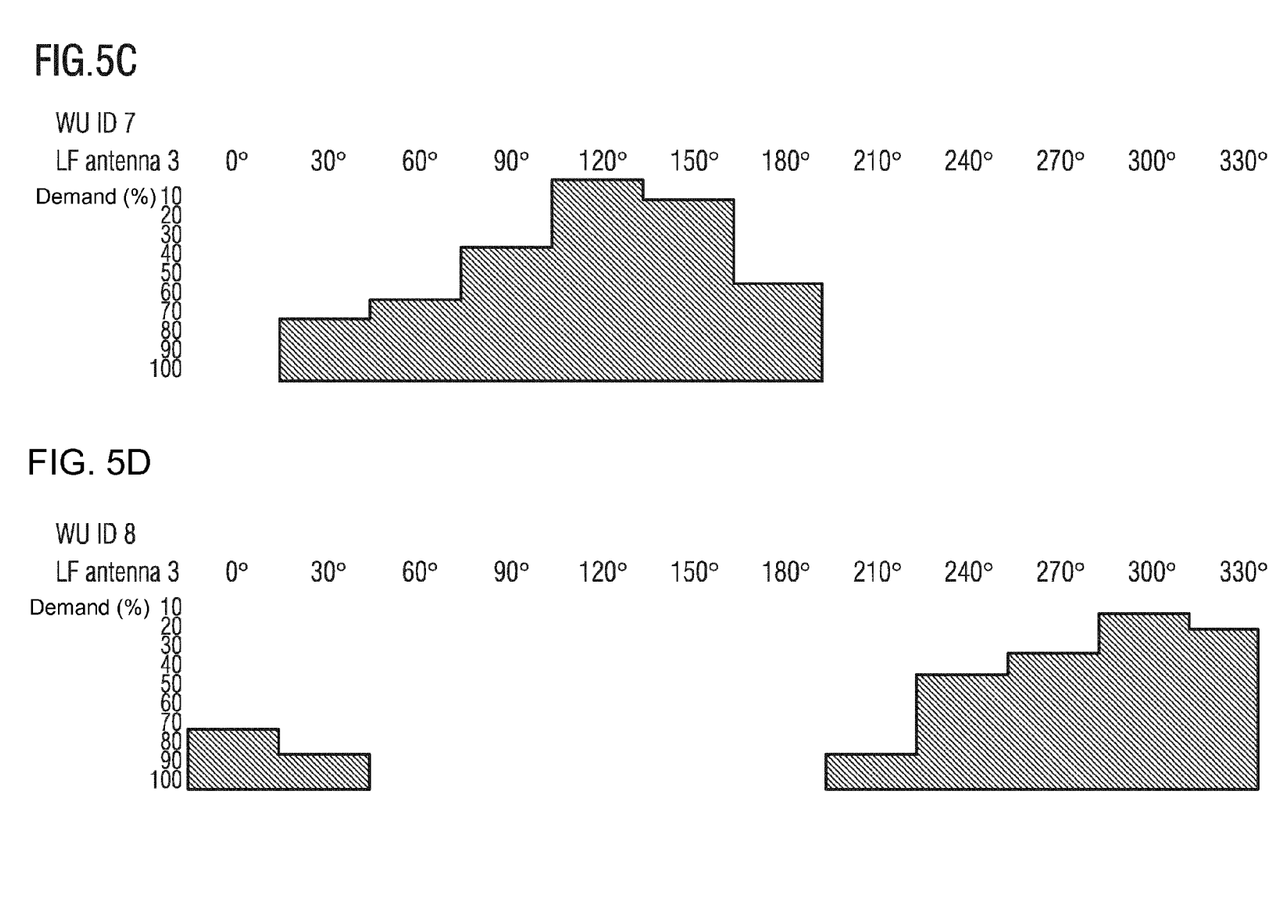

FIGS. 4A and 4B illustrate reception events for the seventh wheel unit, which is installed in the tire 13, and for the eight wheel unit, which is installed in the tire 12, when an LF signal is emitted by means of the LF transmitter 20, which is installed close to the second rear axle 5 on the right-hand side of the vehicle. Wheel units other than the seventh wheel unit and the eighth wheel unit do not register any LF signals that are emitted by the LF transmitter 20. Hence the LF transmitter 20 is also positioned correctly.

A presence of data as illustrated in FIGS. 2A and 2B, 3A and 3B and 4A and 4B can indicate that a criterion for correct arrangement of the LF antennas 16, 19 and 20 is satisfied.

FIGS. 5A, 5B, 5C and 5D illustrate measurement results for incorrect positioning of the LF transmitter 20. Although the seventh wheel unit (which is installed in the tire 13) and the eighth wheel unit (which is installed in the tire 12) correctly register an LF signal emitted by the LF transmitter 20 (see FIGS. 5C and 5D), the third wheel unit (which is installed in the tire 9) and the fourth wheel unit (which is installed in the tire 8) also register an LF signal that is emitted by the LF transmitter 20 (see FIGS. 5A and 5B). In particular, the third wheel unit registers the LF signal emitted by the LF transmitter 20 in an angle range of approximately 180°-270°, while the fourth wheel unit registers this signal in an angle range of approximately 30°-120°. In the case of an LF transmitter 20 arranged in this manner, explicit association of RF signals that are emitted by the wheel units (in order to transmit pressure measurement results, temperature measurement results, inter alia) is therefore not possible. Sole mistriggering of WUID3 and WUID4 does not necessarily require the LF antenna to be repositioned. In general, it would also be possible for the LF power of the LF trigger antenna to be lowered. In the present example, however, the power would need to be reduced to no more than 30%, but this would then result in the required LF coverage of WUID 7 now being only 60% and hence being below the required threshold of at least 90%.

It is therefore necessary for the LF transmitter 20 to be repositioned. To this end, the LF transmitter 20 is displaced (for example shifted, rotated and/or translated) in the directions 21 and 22, for example, and measurement results are recorded for each of these altered positions, in a manner similar to those recorded in FIGS. 5A-5C, until it is possible to infer correct positioning from the recorded data, i.e. the data satisfy a particular criterion, as described above.

Such a program or method for arranging an LF transmitter may in this case be stored in a computer 23 or in a memory that is connected to the controller 19 particularly via an interface. In the event of incorrect positioning of one of the antennas or transmitters 16, 17, 18, 19 or 20, the program can provide a user with advice of the direction in which an incorrectly positioned antenna or an incorrectly positioned receiver should be shifted or displaced. It is also possible for advice regarding an absolute value for a displacement to be output. Alteration of one or more positions of an antenna, or of a receiver, can be continued until a predetermined criterion for the recorded data is satisfied. Depending on the number of axles on the vehicle, the number of tires on the vehicle, this criterion can be customized. In particular, the method can be performed for single-axle, double-axle, triple-axle or quadruple-axle vehicles or vehicles having a different number of axles. In particular, the method can be performed for two tires per axle, four tires per axle or for a different number of tires per axle. The method can easily be performed by an ordinary engineer without further detailed understanding of RF technology or LF technology. In particular, besides an existing tire pressure measurement system, performance of the method may merely require a personal computer or laptop that can be connected to a controller 25 by means of an interface.

According to one embodiment, initially all the LF antennas and RF antennas 16, 17, 18, 19, 20 are installed at proposed positions, which may be known from experience. Next, requisite information is input into the computer 23 or the computer program. The measurement is then started, with the LF signal intensity being altered in steps (for example in 10% downward steps). The LF signal intensity may also be altered continuously. The vehicle 1 is then moved forward or rearward by a particular distance in order to achieve an alteration in the position of the LF receivers that are installed in the wheel units. For the altered position of the vehicle (and hence of the LF receivers), the LF signal intensity is then again altered from a maximum value to a lowest value and the reception events of the various LF receivers are registered and stored. When all the measured values have been recorded, the software can determine whether or not the data meet the prescribed criterion. If the data do not meet the predetermined criterion, the relevant engineer is instructed (by the software) to alter the position of at least one antenna or one receiver (17, 18, 19, 20). In particular, it is important for the controller 25 to be aware of which wheel unit is fitted on which tire or wheel. Therefore, the position needs to be programmed in prior to the beginning of the method for arranging the antennas. In addition, the wheel size and the number of measurement steps can be input into the software. The RF field strength of the RF signal emitted by the wheel units is measured explicitly in the RF receiver that provides the RF field strength for the controller 25 (e.g. an ECU). The ECU 19 may collect a certain number of telegrams and messages and calculate an average for the RF signal emitted by a particular RF transmitter. When a specified number of RF telegrams have been received, the truck or the vehicle 1 may move to the next measurement position (depending on the status of the process for gauging the LF field that is taking place in parallel).

In particular, the LF field that is emitted by an LF transmitter installed on the vehicle is gauged implicitly using the wheel units installed in the tire, while simultaneously the RF field emitted by the wheel units is gauged simultaneously in respect of the strength thereof. In particular, the LF field strength is measured implicitly because a conventional wheel unit (WU) is conventionally not designed to measure the received LF field strength. Instead, a coverage area (or range) for the LF signal emitted by the LF transmitter may be determined indirectly by virtue of specifically only those RF transmitters for which the associated LF detectors have received the LF signal emitting an RF signal. In particular, each LF transmitter installed in the vehicle can be gauged successively in respect of the range (coverage) thereof. If no wheel unit sends an RF signal in response to an LF signal, the vehicle 1 can be moved to a subsequent measurement position. The recorded or collected data can then be evaluated by means of the software in order to check whether the LF coverage area satisfies the specified criterion and whether only intended wheel units have been reached by the LF signal (are within the range). In particular, the LF measurement and RF measurement are performed in parallel. The RF telegrams that are emitted on the basis of the received LF signal are used for measuring the RF field strength. In addition, triggered emissions from the wheel unit may also be used in order to achieve the specific number of RF telegrams per vehicle position.

If no LF antennas are used, the method is capable of performing only the RF portion of the installation or of the arrangement by using triggered or clocked emissions from the wheel units.

The distance by which the vehicle needs to be moved can be obtained by means of the software by using the circumference of the tire and by dividing it by the number of steps. The more measurement steps are accomplished, the more accurate the result may be. If the tire circumference of the vehicle is 3.2 m, for example, and the number of steps is set to 12 (which corresponds to an angular interval of 30°), the vehicle needs to move along twelve times by a distance of 27 cm.

Measurement data can also be obtained by virtue of the vehicle travelling around continuously. The data can then be evaluated using stochastic methods in order to extract the association regarding the manner in which the positioning of the designated RF antennas or LF antennas should be changed.

Exemplary embodiments of the present invention can be implemented either by means of a computer program, that is to say a piece of software, or by means of one or more specific electric circuits, that is to say in hardware, or in any hybrid form, that is to say by means of software components and hardware components.

It is pointed out that the embodiments described here are merely a limited selection of possible variant embodiments of the invention. It is thus possible to combine the features of individual embodiments with one another in a suitable manner, so that a person skilled in the art can take the explicit variant embodiments here and regard a large number of different embodiments as evidently disclosed.

The invention claimed is:

1. A method for gauging an LF field from an LF transmitter, the method which comprises:
 a) transmitting an LF signal at a given LF signal intensity with the LF transmitter;
 b) receiving the LF signal with an LF receiver installed in a tire of a vehicle, wherein the LF receiver is located in an LF receiver position;
 c) transmitting an RF signal in response to receiving the LF signal;
 d) receiving the RF signal with an RF receiver; and
 e) storing data representing the LF signal intensity and the LF receiver position;
 A) repeatedly performing steps a) to e) while changing the LF signal intensity; and
 repeatedly performing step A) while changing the LF receiver position relative to the LF transmitter;
 wherein the step of changing the LF receiver position comprises rotating the tire in steps through an angle about an axis of rotation of the tire.

2. The method according to claim 1, wherein the step of changing the LF signal intensity in step A) comprises decreasing the LF signal intensity in steps.

3. The method according to claim 2, which comprises continuing to decrease the LF signal intensity for as long as the LF receiver installed in the tire of the vehicle receives the LF signal.

4. The method according to claim 1, which comprises initially setting the LF signal intensity to an LF signal intensity that can be produced as a maximum by the LF transmitter.

5. The method according to claim 1, which comprises rotating the tire in steps about the axis of rotation of the tire to vary the LF receiver position over a range of at least 320°.

6. The method according to claim 1, wherein step e) also comprises storing data representing an intensity of the received RF signal and a position of the RF receiver.

7. The method according to claim 6, wherein the step of repeatedly performing step A) comprises changing the LF receiver position relative to the LF transmitter repeatedly by changing the position of the RF receiver.

8. The method according to claim 1, which comprises performing the steps for a plurality of LF receivers, which are respectively installed in a tire selected from a plurality of tires of the vehicle.

9. The method according to claim 1, which comprises performing the steps for a plurality of LF transmitters.

10. The method according to claim 1, wherein the LF signal has a frequency between 100 kHz and 200 kHz.

11. The method according to claim 1, wherein the RF signal has a frequency between 300 MHz and 500 MHz.

12. The method according to claim 1, wherein the LF field emitted by the LF transmitter has a range between 1 cm and 200 cm.

13. The method according to claim 1, wherein one or both of the LF transmitter or the RF receiver are actuated by a tire pressure measurement system actuated by a computer program.

14. A method for arranging an LF transmitter for sending an LF signal to an LF receiver installed in a tire of a vehicle and/or for arranging an RF receiver, the method which comprises:

performing the method for gauging an LF field of the LF transmitter according to claim 1;

determining whether the data meet a predetermined criterion; and if the data do not meet the predetermined criterion, changing a position of one or both of the LF transmitter or the RF receiver and performing the method for gauging an LF field of the LF transmitter according to claim 1.

15. A non-transitory computer-readable storage medium having stored thereon a program configured to perform or control the method according to claim 1 when loaded into a computer.

16. A program element which, when executed by a processor, is set up to perform or control the method according to claim 1.

* * * * *